United States Patent
Gagas et al.

(10) Patent No.: US 11,685,261 B2
(45) Date of Patent: Jun. 27, 2023

(54) ENHANCED ELECTRIC DRIVE VEHICLE PERFORMANCE WITH EXTENDED MOTOR TORQUE CAPABILITIES

(71) Applicant: GM GLOBAL TECHNOLOGY OPERATIONS LLC, Detroit, MI (US)

(72) Inventors: Brent S. Gagas, Ferndale, MI (US); Brian A. Welchko, Oakland, MI (US); Kerrie M. Spaven, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 463 days.

(21) Appl. No.: 17/080,033

(22) Filed: Oct. 26, 2020

(65) Prior Publication Data

US 2022/0126701 A1 Apr. 28, 2022

(51) Int. Cl.
*B60L 15/20* (2006.01)
*B60K 1/00* (2006.01)
*B60K 1/04* (2019.01)
*B60L 50/60* (2019.01)
*B60L 53/24* (2019.01)

(52) U.S. Cl.
CPC .............. *B60L 15/20* (2013.01); *B60K 1/00* (2013.01); *B60K 1/04* (2013.01); *B60L 50/60* (2019.02); *B60L 53/24* (2019.02); *B60L 2210/40* (2013.01); *B60L 2240/421* (2013.01); *B60L 2240/423* (2013.01); *B60L 2240/525* (2013.01); *B60L 2260/42* (2013.01); *B60L 2260/44* (2013.01)

(58) Field of Classification Search
CPC .......... B60L 15/20; B60L 50/60; B60L 53/24; B60L 2210/40; B60L 2240/421; B60L 2240/423; B60L 2240/525; B60L 2260/42; B60L 2260/44; B60K 1/00; B60K 1/04
See application file for complete search history.

(56) References Cited

U.S. PATENT DOCUMENTS

| | | | | |
|---|---|---|---|---|
| 5,264,764 A | * | 11/1993 | Kuang | B60L 15/2045 180/65.245 |
| 6,209,672 B1 | * | 4/2001 | Severinsky | B60K 6/442 180/65.23 |
| 6,275,004 B1 | | 8/2001 | Tamai et al. | |

(Continued)

*Primary Examiner* — Gertrude Arthur Jeanglaude
(74) *Attorney, Agent, or Firm* — Quinn IP Law (57) ABSTRACT

Presented are high-voltage electrical systems, control logic, and electric-drive vehicles with optimized motor torque output. A method of operating an electric-drive vehicle includes a controller identifying the vehicle's operating mode and determining calibration settings corresponding to this operating mode. These calibration settings include low and high coolant temperature (CoolTemp) thresholds, and motor-calibrated torque limits as a function of CoolTemp. The controller determines if the present CoolTemp of the power inverter's coolant is greater than the low CoolTemp threshold and less than the high CoolTemp threshold. If so, the controller sets a motor torque limit of the vehicle's electric motor to a torque limit value selected from a fixed torque limit region within the torque limits data between the low and high CoolTemp thresholds. The controller operates the power inverter to regulate the transfer of electrical power between a rechargeable battery and the electric motor based on the motor torque limit.

20 Claims, 4 Drawing Sheets

(56) References Cited

U.S. PATENT DOCUMENTS

| | | |
|---|---|---|
| 6,752,131 B2 | 6/2004 | Poola et al. |
| 6,994,072 B2 | 2/2006 | Kuo et al. |
| 7,128,047 B2 | 10/2006 | Kuo et al. |
| 7,367,313 B2 | 5/2008 | Chang et al. |
| 7,463,970 B2 | 12/2008 | Livshiz et al. |
| 7,689,343 B2 | 3/2010 | Dagci et al. |
| 7,725,244 B2 | 5/2010 | Itoga et al. |
| 8,000,882 B2 | 8/2011 | Ramappan et al. |
| 8,210,158 B2 | 7/2012 | Kang et al. |
| 8,316,818 B2 | 11/2012 | Ramappan et al. |
| 8,347,860 B2 | 1/2013 | Kang et al. |
| 8,565,949 B2 | 10/2013 | Christman et al. |
| 8,708,071 B2 * | 4/2014 | Yokoyama ............ B60L 50/51 |
| | | 180/65.265 |
| 8,776,737 B2 | 7/2014 | Bayer et al. |
| 9,074,551 B2 | 7/2015 | Yun et al. |
| 9,142,980 B2 | 9/2015 | Lee |
| 9,334,815 B2 | 5/2016 | Cygan, Jr. et al. |
| 9,551,248 B2 | 1/2017 | Warey et al. |
| 9,660,462 B2 | 5/2017 | Jeon |
| 9,689,321 B2 | 6/2017 | Kang et al. |
| 9,689,339 B2 | 6/2017 | Kang et al. |
| 10,355,631 B1 | 7/2019 | Secrest et al. |
| 10,396,696 B1 | 8/2019 | Gagas et al. |
| 10,541,614 B1 | 1/2020 | Gagas et al. |
| 2008/0284385 A1 | 11/2008 | Namuduri et al. |
| 2011/0215767 A1 | 9/2011 | Johnson et al. |
| 2011/0247587 A1 | 10/2011 | Chen |
| 2011/0248675 A1 | 10/2011 | Shiu et al. |
| 2012/0181854 A1 | 7/2012 | Gopalakrishnan et al. |
| 2012/0206296 A1 | 8/2012 | Wan |
| 2013/0080023 A1 | 3/2013 | Livshiz et al. |
| 2013/0080026 A1 | 3/2013 | Kang et al. |
| 2013/0119935 A1 | 5/2013 | Sufrin-Disler et al. |
| 2013/0127399 A1 | 5/2013 | Tang et al. |
| 2014/0152232 A1 | 6/2014 | Johnson et al. |
| 2016/0258410 A1 | 9/2016 | Cygan, Jr. et al. |
| 2016/0362020 A1 | 12/2016 | Shepley et al. |
| 2020/0021226 A1 | 1/2020 | Welchko et al. |

* cited by examiner

ENHANCED ELECTRIC DRIVE VEHICLE PERFORMANCE WITH EXTENDED MOTOR TORQUE CAPABILITIES

INTRODUCTION

The present disclosure relates generally to hybrid-electric and full-electric motor vehicles. More specifically, aspects of this disclosure relate to systems, methods, and devices for optimizing electric drive operations for battery electric vehicles (BEVs).

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric (collectively "electric-drive") vehicles, on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Many commercially available hybrid electric and full electric vehicles employ a rechargeable traction battery pack to store and supply the requisite power for operating the powertrain's traction motor(s). In order to generate tractive power with sufficient vehicle range and speed, a traction battery pack is significantly larger, more powerful, and higher in capacity (Amp-hr) than a standard 12-volt starting, lighting, and ignition (SLI) battery. Compared to the single cell of an SLI battery, contemporary traction battery packs group stacks of lithium-ion, lead-acid, or nickel-based battery cells into individual battery modules that are mounted onto the vehicle chassis, e.g., via a battery housing or support tray. Stacked electrochemical battery cells may be connected in series and/or parallel through use of an electrical interconnect board (ICB). The electrical tabs of the individual battery cells, which project out from the module housing, are bent against and subsequently welded to shared busbar plates for inter-module connectivity. A dedicated Battery Pack Control Module (BPCM), through collaborative operation with the vehicle's Powertrain Control Module (PCM), regulates the opening and closing of battery pack contactors to regulate operation of the battery pack for powering the vehicle's traction motor(s).

A high-voltage (HV) electrical system helps to govern the transfer of electricity between an electric-drive vehicle's traction motor(s) and onboard traction battery pack. HV electric systems often employ a front-end, DC-to-DC electric power converter that is electrically connected to the vehicle's traction battery pack in order to increase the supply of voltage to a high-voltage, main DC bus and an electronic power inverter module (PIM). A high-frequency bulk capacitor may be arranged across the positive and negative rails of the main DC bus to provide electrical stability and store supplemental electrical energy. Operation and control of a traction motor, which may be in the nature of a polyphase alternating current (AC) motor generator unit (MGU), may be accomplished by employing the PIM to transform battery-generated direct current (DC) power to motor-driving AC power using pulse-width modulated control signals output from the PCM. Motor windings of each polyphase AC MGU may be coupled to inverter sub-modules of the PIM, each of which employs a pair of switches that open/close in a complementary manner to perform a fast-switching function to convert DC power to AC power, and vice versa.

SUMMARY

Presented herein are high-voltage electrical systems with attendant control logic for optimized motor torque output, methods for making and methods for operating such systems, and intelligent electric-drive vehicles with enhanced electric drive performance to extend coolant-temp based torque capabilities. By way of example, disclosed systems and methods enhance electric drive performance utilizing system controls flexibility and pulse width modulation (PWM) type selection to extend motor torque capabilities over larger ranges of inverter coolant temperatures. Motor torque operating ranges may be intelligently varied in real-time or near real-time as a function of inverter coolant temperature, vehicle/inverter operating mode, DC bus current, and DC bus voltage. These torque operating ranges may be constrained by electrical overstress and thermal limits of the system hardware, for example, via implementation of torque and current limits.

Attendant benefits for at least some of the disclosed concepts include increased motor torque and power capabilities that preclude electrical overstress and unnecessary hardware derating while working within calibrated hardware operating and thermal limits. In addition, by applying variable current limits to the torque-speed curve, electrical stress/durability impacts are decoupled from mechanical stress/durability impacts. Moreover, enhanced torque capabilities may be limited to predefined inverter performance modes and/or vehicle operating modes to balance enhanced motor performance with hardware durability, thermal performance, system efficiency, and noise, vibration and harshness (NVH). Utilizing system controls and calibration flexibility to optimize motor torque capabilities may also act as an enabler for part and system cost reductions through downsizing the power inverter and inverter current rating.

Aspects of this disclosure are directed to HV electrical system control logic, closed-loop feedback control techniques, and computer-readable media (CRM) for extended motor torque output across larger ranges of inverter coolant temperature. In an example, a method is presented for operating an HV electrical system, which may be used in both automotive and non-automotive applications alike. This representative method includes, in any order and in any combination with any of the above and below disclosed options and features: identifying, via one or more resident or remote electronic controllers, an operating mode of an electric-drive vehicle and/or a power inverter; selecting, retrieving, calculating, and/or estimating (collectively "determining") a set of calibration settings corresponding to this operating mode, the calibration settings including a first (low) coolant temperature (CoolTemp) threshold, a second (high) CoolTemp threshold higher than the first CoolTemp threshold, and a data set (e.g., lookup table, graph, etc.) of motor-calibrated torque limits as a function of CoolTemp and a present DC bus voltage of the DC bus; determining if a present CoolTemp of a coolant flowing through the power inverter is both greater than or equal to the first (low) CoolTemp threshold and less than or equal to the second (high) CoolTemp threshold; if so, responsively setting a motor torque limit of one or more electric motors to a first (normal) torque limit value selected from a first (normal) fixed torque limit region located within the motor-calibrated torque limit data, between the first and second CoolTemp thresholds; and transmitting, via the controller to the power inverter, one or more command signals to regulate the transfer of electrical power between a rechargeable battery/battery pack and the electric motor(s) based on the preset motor torque limit.

Additional aspects of this disclosure are directed to HV electrical systems, electrified powertrains, and motor vehicles with extended motor torque capabilities. As used herein, the terms "vehicle" and "motor vehicle" may be used interchangeably and synonymously to include any relevant vehicle platform, such as passenger vehicles (HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, electric bicycles (ebike), electric scooters, etc. For non-automotive applications, disclosed concepts may be implemented for a stand-alone power station, a commercial or residential generator system, etc. In an example, a motor vehicle includes a vehicle body with a passenger compartment, multiple road wheels mounted to the vehicle body, and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle.

Continuing with the discussion of the above example, the vehicle also includes at least one traction battery pack that is mounted onto the vehicle body and operable to power the vehicle powertrain's traction motor(s). A power inverter module, which electrically connects the traction battery pack(s) to the traction motor(s), e.g., via a main DC bus, receives DC power output by the battery pack or packs. The PIM converts the received DC power to AC power and, once converted, transfers the AC power to the traction motor or motors for desired vehicle propulsion. The PIM may also convert AC power received from the motor to DC power, which is then transferred to the RESS.

An onboard or off-board vehicle controller is programmed to identify an operating mode of the electric-drive vehicle/PIM and determine a set of calibration settings corresponding to this operating mode. These calibration settings include a first (low) coolant temperature threshold, a second (high) coolant temperature threshold, and a data set of motor-calibrated torque limits as a function of coolant temperature and a present DC bus voltage of the DC bus. The vehicle controller also determines if a present coolant temperature of PIM coolant is both greater than or equal to the first (low) CoolTemp threshold and less than or equal to the second (high) CoolTemp threshold. If so, the controller responsively sets a motor torque limit of the traction motor(s) to a first (normal) torque limit value that is selected from a first (normal) fixed torque limit region located within the motor-calibrated torque limits, between the CoolTemp thresholds. The controller then transmits one or more command signals to the PIM to regulate the transfer of electrical power between the rechargeable battery/battery pack and the traction motor/motors based on the set motor torque limit.

For any of the disclosed systems, methods, and vehicles, the first CoolTemp threshold may include a first (normal or norm) low CoolTemp threshold and a second (minimum or min) low CoolTemp threshold. In this instance, the controller may respond to the inverter's coolant temperature being both less than the norm-low CoolTemp threshold and greater than the min-low CoolTemp threshold by setting the motor torque limit to a second (blended-low) torque limit value. The blended-low torque limit value is selected from a first (low) variable torque limit region between the normal and min-low CoolTemp thresholds. Selecting a torque limit value from this variable torque limit region may include interpolating between the normal fixed torque limit region and a second (low) fixed torque limit region, which is located within the motor-calibrated torque limits, below the second (min) low CoolTemp threshold. If the present CoolTemp is less than both the norm-low and min-low thresholds, the controller may responsively set the motor torque limit to a third (low) torque limit value selected from a second (low) fixed torque limit region, which is located within the set of motor-calibrated torque limits, below the min-low present CoolTemp threshold.

For any of the disclosed systems, methods, and vehicles, the second CoolTemp threshold includes a first (normal or norm) high CoolTemp threshold and a second (maximum or max) high CoolTemp threshold. In this instance, the controller may respond to the inverter's coolant temperature being both greater than the norm-high CoolTemp threshold and less than the max-high CoolTemp threshold by setting the motor torque limit to a fourth (blended-high) torque limit value. The blended-high torque limit value is selected from a second (high) variable torque limit region located within the set of motor-calibrated torque limits, between the norm and max-high thresholds. Selecting a torque limit value from this variable torque limit region may include interpolating between the normal fixed torque limit region and a third (high) fixed torque limit region, which is located within the motor-calibrated torque limits, above with the second (max) high CoolTemp threshold. If the present inverter coolant temperature is greater than both the norm and max-high CoolTemp thresholds, the controller may responsively set the motor torque limit to a fifth (high) torque limit value selected from a third (high) fixed torque limit region, which is located within the set of motor-calibrated torque limits, above with the maximum high threshold.

For any of the disclosed systems, methods, and vehicles, identifying the operating mode of the vehicle/PIM may include an electronic controller receiving, e.g., from a user input device and/or a powertrain control module, a selection from a plurality of operating modes of the vehicle and/or power inverter. In this instance, determining the calibration settings that correspond to a selected operating mode may include an electronic controller retrieving the calibration settings from a resident or remote memory device, which stores a respective set of calibration settings for each operating mode. As yet a further option, the electronic controller may be programmed to select a pulse width modulation type as a function of the operating mode and the inverter's real-time coolant temperature. In this instance, regulating the transfer of electrical power between the rechargeable battery/battery pack and the electric motor via the power inverter is further based on the selected PWM type.

For any of the disclosed systems, methods, and vehicles, the calibration settings include a stall torque threshold of the electric motor. This stall torque threshold may be selected from a plurality of stall torque thresholds based on the operating mode of the electric-drive vehicle and/or the power inverter. In this instance, the controller may be further programmed to determine if a stall torque speed threshold of the stall torque threshold is greater than the present speed of the electric motor and, if so, responsively set the motor torque limit to the stall torque threshold. As yet a further option, the motor torque limit includes both a base motor torque limit and an enhanced motor torque limit. In this instance, the base motor torque limit is associated with a first pulse width modulation type (e.g., a continuous pulse width modulation (CPWM) technique, such as space vector pulse width modulation (SVPWM)) and is restricted by a maximum junction temperature of the power inverter. By comparison, the enhanced motor torque limit, which is higher than the base motor torque limit, is associated with a second PWM type (e.g., a discontinuous pulse width modulation (DPWM) technique, such as multilevel generalized discontinuous pulse width modulation (GDPWM)) and is restricted by the maximum junction temperature, a DC bus voltage limit, and an electrical overstress/current sensing limit of the power inverter.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
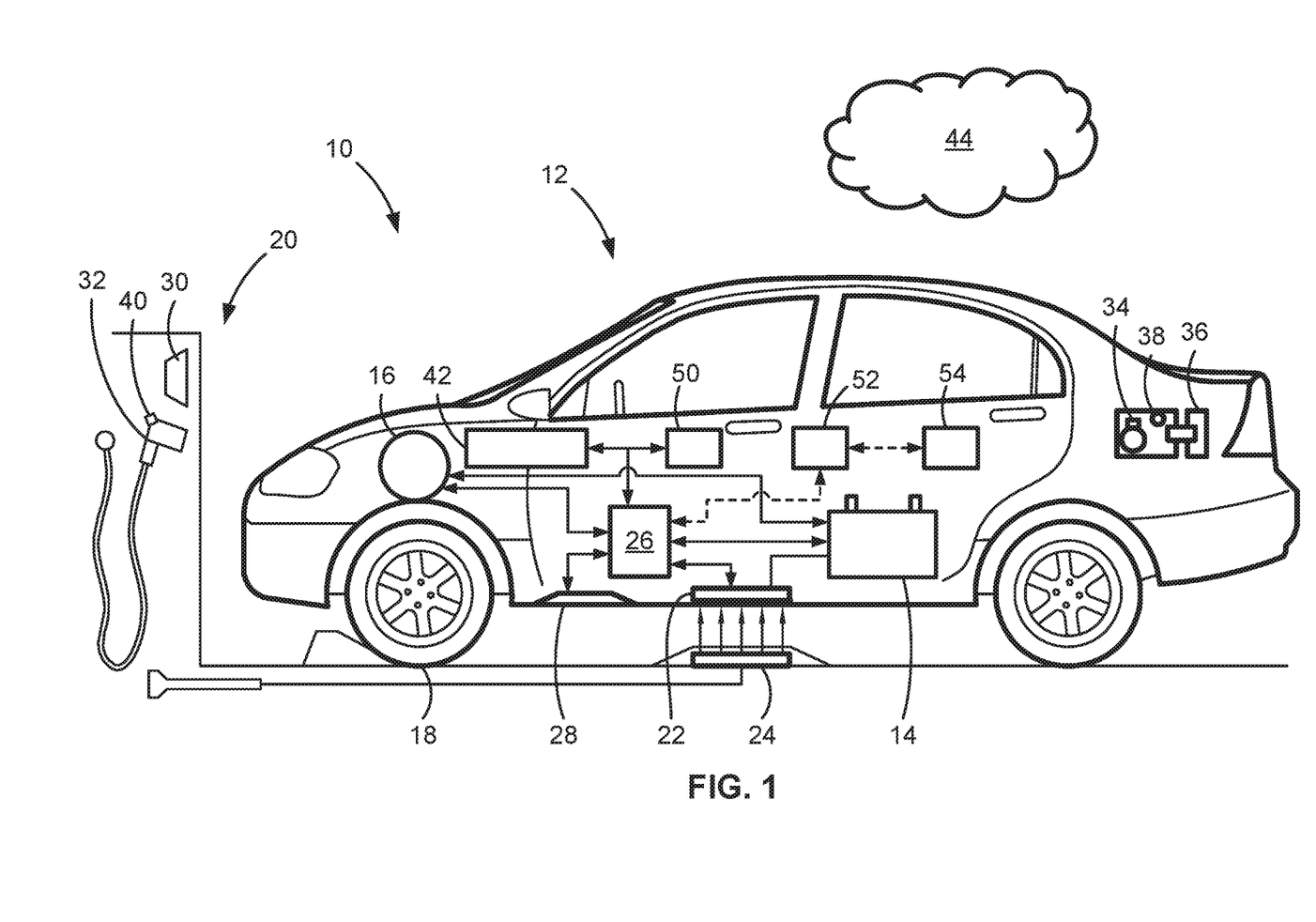
FIG. 1 is a partially schematic, side-view illustration of a representative electric-drive vehicle with enhanced electric drive performance with extended motor torque capabilities according to aspects of the disclosed concepts.

Referring now to the drawings, wherein like reference numbers refer to like features throughout the several views, there is shown in FIG. 1 a representative automobile, which is designated generally at 10 and portrayed herein for purposes of discussion as a sedan-style, plug-in battery electric vehicle (BEV). The illustrated automobile 10—also referred to herein as "motor vehicle" or "vehicle" for short—is merely an exemplary application with which novel aspects of this disclosure may be practiced. In the same vein, incorporation of the present concepts into an all-electric BEV powertrain should also be appreciated as a non-limiting implementation of disclosed novel features. As such, it will be understood that aspects and features of this disclosure may be applied to other electrified powertrain architectures, implemented for any logically relevant type of vehicle, and utilized for both automotive and non-automotive applications alike. Moreover, only select components of the motor vehicles and HV electrical systems are shown and described in additional detail herein. Nevertheless, the vehicles and systems discussed below may include numerous additional and alternative features, and other available peripheral components, for carrying out the various methods and functions of this disclosure.

FIG. 1 is a simplified illustration of the electric-drive vehicle 10 docked at and operably coupled to a vehicle charging station 20 for recharging an onboard rechargeable energy source, such as a high-voltage, direct current (DC) traction battery pack 14. Traction battery pack 14 may take on many suitable configurations, including an array of stacked lead-acid, lithium-ion, or other applicable type of rechargeable electric battery cell. To provide an operable coupling between the traction battery pack 14 and vehicle charging station 20, the vehicle 10 may include an inductive charging component 22 with an integrated induction coil that is mounted to the underside of the vehicle body 12. This inductive charging component 22 serves as a wireless charging interface that is compatible with a wireless charging pad 24 with an internal EMF coil of the vehicle charging station 20. In the illustrated example, the wireless charging pad 24 is located on the floor of the charging station 20, and is positioned in accordance with a "target position" that may serve as a desired parking location for purposes of efficient and effective wireless charging of the vehicle 10. In particular, FIG. 1 depicts the vehicle 10 parked in proper fore-aft alignment and in proper starboard-port alignment with the charging pad 24—aligned with the target position—to complete an inductive charging event for the battery pack 14 that maximizes the percentage of power transmitted wirelessly between the two devices.

The vehicle charging station 20 may employ any heretofore and hereafter developed type of wired and wireless charging technology, including inductive charging, radio charging, capacitive charging, and resonance charging, as some non-limiting examples. In accordance with electromagnetic induction charging technology, the representative wireless charging pad 24 of FIG. 1 may be activated with electric current to generate an alternating electromagnetic field proximate the inductive charging component 22. This time-variant magnetic field, in turn, induces an electric current in the inductive charging component 22 of the vehicle 10. The induced current may be filtered, stepped-down, and/or phase-shifted by in-vehicle electrical modulation circuitry (e.g. a traction power inverter module (TPIM) 26) to charge the traction battery pack 14 or any other energy source of the vehicle 10 (e.g., a standard 12V lead-acid starting, lighting, and ignition (SLI) battery, an auxiliary power module, etc.).

Traction battery pack 14 stores energy that can be used for propulsion by one or more electric traction motors 16 and for operating other vehicle electrical systems. The traction battery pack 14 is communicatively connected (wired or wirelessly) to one or more vehicle controllers, represented in FIG. 1 by electronic control unit (ECU) 42, that regulate the operation of various onboard vehicle systems and components. Contactors controlled by the ECU 42, for example, may isolate the traction battery pack 14 from select components when opened, and connect the traction battery pack 14 to select components when closed. The ECU 42 is also communicatively connected to the electric traction motor(s) 16 to control, for example, bi-directional transfer of energy between the traction battery pack 14 and each motor 16. For instance, traction battery pack 14 may provide a DC voltage while the motor(s) 16 may operate using a three-phase AC current; in such an instance, a TPIM 26 governed by ECU 42 converts the DC voltage to a three-phase AC current for use by the motors 16. In a regenerative mode, e.g., in which the traction motor 16 is configured as motor-generator unit (MGU), the ECU-controlled TPIM 26 converts AC power from the motor-generator(s) 16 to DC power compatible with the traction battery pack 14. The representative ECU 42 is also shown communicating with charging component 22, for example, to condition the power supplied from the vehicle charging station 20 to the battery pack 14 to help ensure proper voltage and current levels.

Vehicle charging station 20 of FIG. 1 also offers wired charging for electric vehicle 10 via a "plug-in" electrical connector 32, which may be one of a number of different commercially available electrical connector types. By way of non-limiting example, electrical connector 32 may be a Society of Automotive Engineers (SAE) J1772 (Type 1) or J1772-2009 (Type 2) or International Electrotechnical Commission (IEC) 62196-2 and/or 62196-3 Fdis compatible electrical connector with single-phase or split-phase modes operating at 120 to 240 volts (V) with alternating current (AC) at up to 80 amperes (A) peak current for conductive charging. A charge port 34 accessible on the exterior of vehicle body 12 is a wired charging interface functioning as an electrical inlet into which electrical connector 32 may be plugged or otherwise mated. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the vehicle 10 and station 20 may individually or collaboratively monitor wired/wireless charging availability, wireless power quality, proper vehicle alignment, charge component compatibility, and other related issues that may affect vehicle charging. According to the illustrated example, the vehicle ECU 42 of FIG. 1 communicates with and receives sensor signals from a monitoring system, which may comprise one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that shown in the drawings. A CPD sensor 38 mounted by the charge port 34 may sense, and be polled or read by the vehicle's ECU 42 to determine, a door status—opened or closed—of the CPD 36. As another option, a latching button 40 that helps to physically attach and secure the electrical connector 32 to the charge port 34 may include an internal switch (e.g., an SAE S3 type switch) that functions as a sensing device to detect whether or not the electrical connector 32 is operatively connected to the charge port 34.

Propulsion of the electric-drive vehicle 10 of FIG. 1 is provided by an electrified powertrain system, which is represented herein by a traction motor 16 that is powered by a rechargeable battery pack 14 through cooperative operation of the ECU 42 and TPIM 26 to drive one or more of the vehicle's road wheels 18. Traction motor 16 may be a brushless permanent magnet (PM), multiphase AC MGU that receives modulated DC electrical power generated by lithium-polymer battery modules inside the chassis-mounted traction battery pack 14. To optimize EV performance, vehicle range, and powertrain NVH, the ECU 42 and TPIM 26 utilize intelligent system controls and hardware calibration flexibility to extend motor torque capabilities across a larger range of inverter coolant temperatures. Variable motor torque limits and stall torques may be derived as a function of inverter coolant temperature and constrained by electrical overstress and current sensing limits, DC bus voltage limits, and hardware operating and thermal limits. To meet these constraints, a combination of variable torque and current limiting may be implemented. Applying variable current limits to the torque-speed curve allows for the decoupling of electrical stress/durability impacts from mechanical stress/durability impacts. To balance tradeoffs between enhanced EV performance and powertrain NVH, hardware durability, thermal performance, and system efficiency, enhanced EV performance may be limited to specific inverter performance and/or vehicle modes.

Motor torque and power output may be extended into higher coolant temperature regions by operating within hardware thermal limits, such as junction temperature, without derating the PIM. Torque capabilities may be extended in this manner by limiting current at very high bus voltages, in both high and low coolant temperature regions, e.g., to protect the powertrain's electrified hardware from electrical overstress. Moreover, calibration flexibility may be achieved by defining motor torque limit tables for the individual vehicle/PIM operating mode, with each table comprising low, blended-low, normal, blended-high, and high inverter coolant temperature regions. Respective fixed torque limit regions may be defined for the low, normal, and high inverter coolant temperatures. Variable torque limit regions, which employ linear interpolation for torque limit selection, may be defined for the "blended" inverter coolant temperatures located between the low and normal temperatures and the normal and high temperatures.

As mentioned above, variable current limits may be applied to a torque-speed curve to decouple the electrical and mechanical stress/durability impacts. For instance, torque capabilities may be limited at low inverter coolant temperatures, for example, to avoid electrical overstress. Current capabilities may be limited at very high bus voltages, for example, to avoid electrical overstress. As yet a further option, torque capabilities may be limited at high inverter coolant temperatures, for example, to help ensure the motor operates within its thermal limits.

To minimize undesirable wear and impact on hardware durability, and concomitantly mitigate powertrain NVH while increasing overall motor output, enhanced EV performance with increased motor output may be limited to specific inverter performance modes and/or specific vehicle operating modes. By way of example, and not limitation, motor torque/power limits may be increased for an EV's Performance Mode and Sport Mode (e.g., for maximum vehicle acceleration and speeds). By comparison, motor stall torque capabilities may be increased for a vehicle's Off-Road Mode (e.g., to offer better traction, stability and control on different types of surfaces). Torque and current thresholds may be limited for Eco Mode (e.g., for increased vehicle range and/or fuel economy). Increased torque and current capability without changing hardware by avoiding "corner cases" or reduce power module current ratings (cost savings) and still achieve baseline torque. A "stall torque" may be typified as the torque produced by an electric machine whose output rotational speed is at or near zero. Electric motors will typically continue to provide torque when stalled; stalling of a motor ("motor stall") is a condition at which the motor's rotor stops rotating, for example, when the load torque is greater than the maximum torque output of the motor. A "corner case" may reference those instances in which the motor is operating at very high or very low temperatures and/or at very high DC bus voltages, whereat electrical overstress limits are more constrained.

Figure 3:
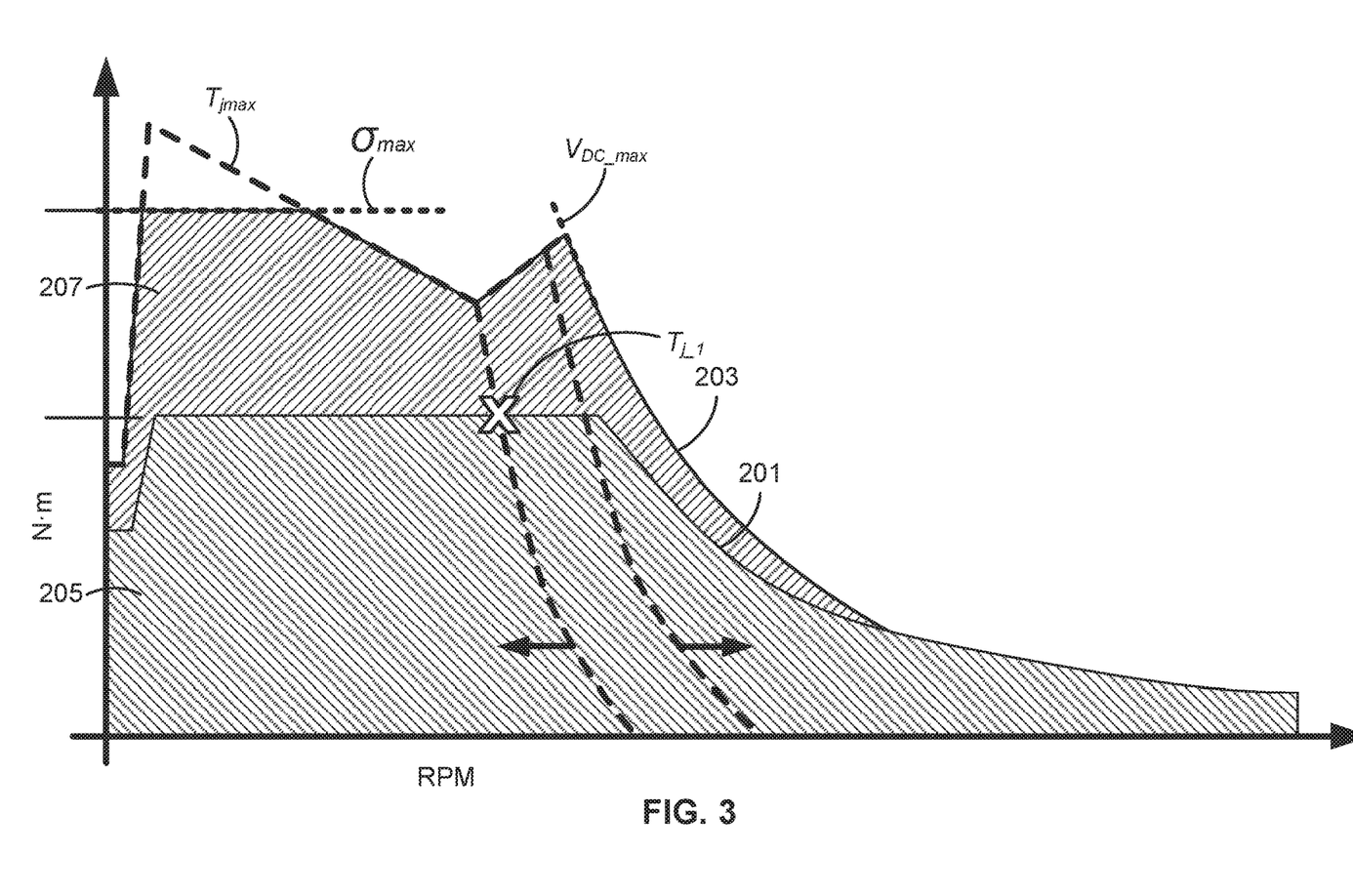
FIG. 3 is a representative graph of motor speed (revolutions per minute (RPM)) vs. motor torque (Newton-meters (N·m)) illustrating increased motor torque and power output utilizing system controls and calibration flexibility in accord with aspects of the disclosed concepts.

Turning next to FIG. 3, a graph of motor speed (revolutions per minute (RPM); x-axis) vs. motor torque (Newton-meters (N·m); y-axis)—more commonly referred to as a "torque-speed curve"—is presented for a representative electric motor that is operated in accordance with the subject techniques. In this example, there are two torque-speed curves: a first torque-speed curve 201 associated with a default or "base" operating strategy; and a second torque-speed curve 203 associated with a performance or "enhanced" operating strategy. For synchronous or asynchronous multiphase electric machine control, the base operating strategy implements a CPWM technique, such as SVPWM, across a base region 205 with a maximum motor torque limit that is restricted by a single maximum junction temperature point $T_{j\_1}$. By comparison, the enhanced performance operating strategy implements a DPWM technique across an enhanced region 207 with a maximum motor torque limit that is restricted by a dynamic junction temperature max Tj_max limit, an overstress limit $\sigma_{max}$, and a DC bus voltage limit $V_{DC\_lim}$. When comparing the base and enhanced regions 205, 207, the max motor torque output available for the base region 205 is markedly lower; the enhanced region 207 enables the system to increase maximum available motor torque and power output while operating within hardware limits.

Figure 4:
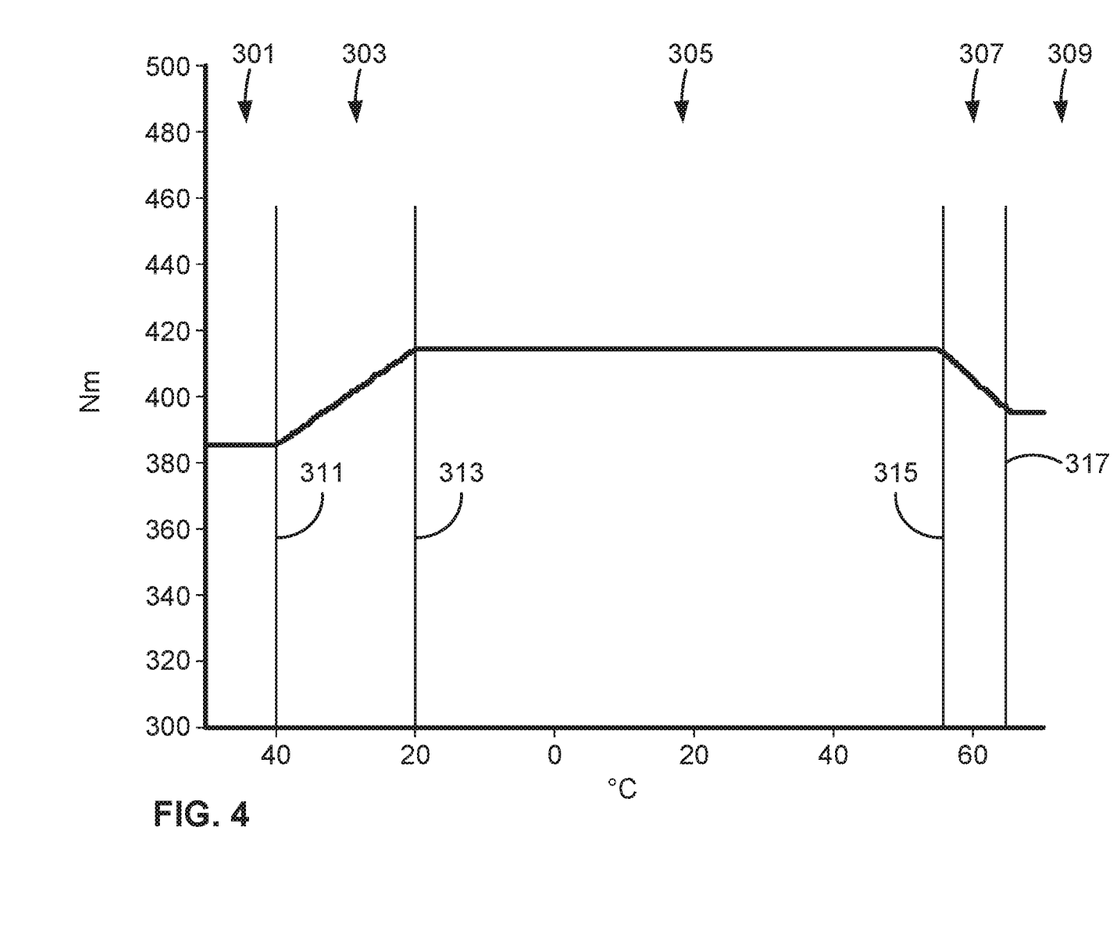
FIG. 4 is a representative graph of inverter coolant temperature (degrees Celsius (° C.)) vs. motor torque (N·m) illustrating increased motor torque output across a larger range of coolant temperatures utilizing multi-zone torque limit data to selectively vary motor torque limits in accord with aspects of the disclosed concepts.

FIG. 4 is a graph of motor torque (N·m; y-axis) as a function of inverter coolant temperature (° C.; x-axis) for a representative electric motor illustrating increased motor torque output across a larger range of coolant temperatures utilizing multi-zone torque limit data to selectively vary motor torque limits. In this example, motor torque is segmented into five neighboring regions: a low temp region 301 (Zone 1) at temperatures below about −40° C.; a blended-low temp region 303 (Zone 2) adjoining the low temp region 301 and ranging from about −40° C. to about −20° C.; a normal temp region 305 (Zone 3) adjoining the blended-low temp region 303 and ranging from about −20° C. to about 55° C.; a blended-high temp region 307 (Zone 4) adjoining the normal temp region 305 and ranging from about 55° C. to about 65° C.; and a high temp region 309 (Zone 5) at temperatures above 65° C. and adjoining the blended-high temp region 307. Zones 1 and 2 301, 303 are separated by a min-low coolant temperature threshold 311, whereas Zones 2 and 3 303, 305 are separated by a norm-low coolant temperature threshold 313. In the same vein, Zones 3 and 4 305, 307 are separated by a norm-high coolant temperature threshold 315, whereas Zones 4 and 5 307, 309 are separated by a max-high coolant temperature threshold 317.

With continuing reference to FIG. 4, the temperature zones and their delineating temperature thresholds may be calibrated to a particular electric motor for a specific performance mode to achieve increased motor torque and power output within the constraints of the motor's electrical overstress and thermal limits. For instance, the min-low CoolTemp threshold 311 may provide protection for the hardware from electrical overstress. The max-high CoolTemp threshold 317 may function to both protect the hardware from electrical overstress and to help to ensure the inverter is operating within thermal limits to avoid derating. Comparatively, the norm-low and norm-high CoolTemp thresholds 313, 315 may help to maximize motor output without unnecessarily abusing the powertrain hardware. The low, normal, and high inverter coolant temperature regions 301, 305, 309 may be provided with predefined torque limit data (e.g., lookup tables), whereas torque limits for each of the blended temp regions 303, 307 may be calculated by linearly interpolating from the torque limit data/tables of their respective adjoining temp regions.

Figure 2:
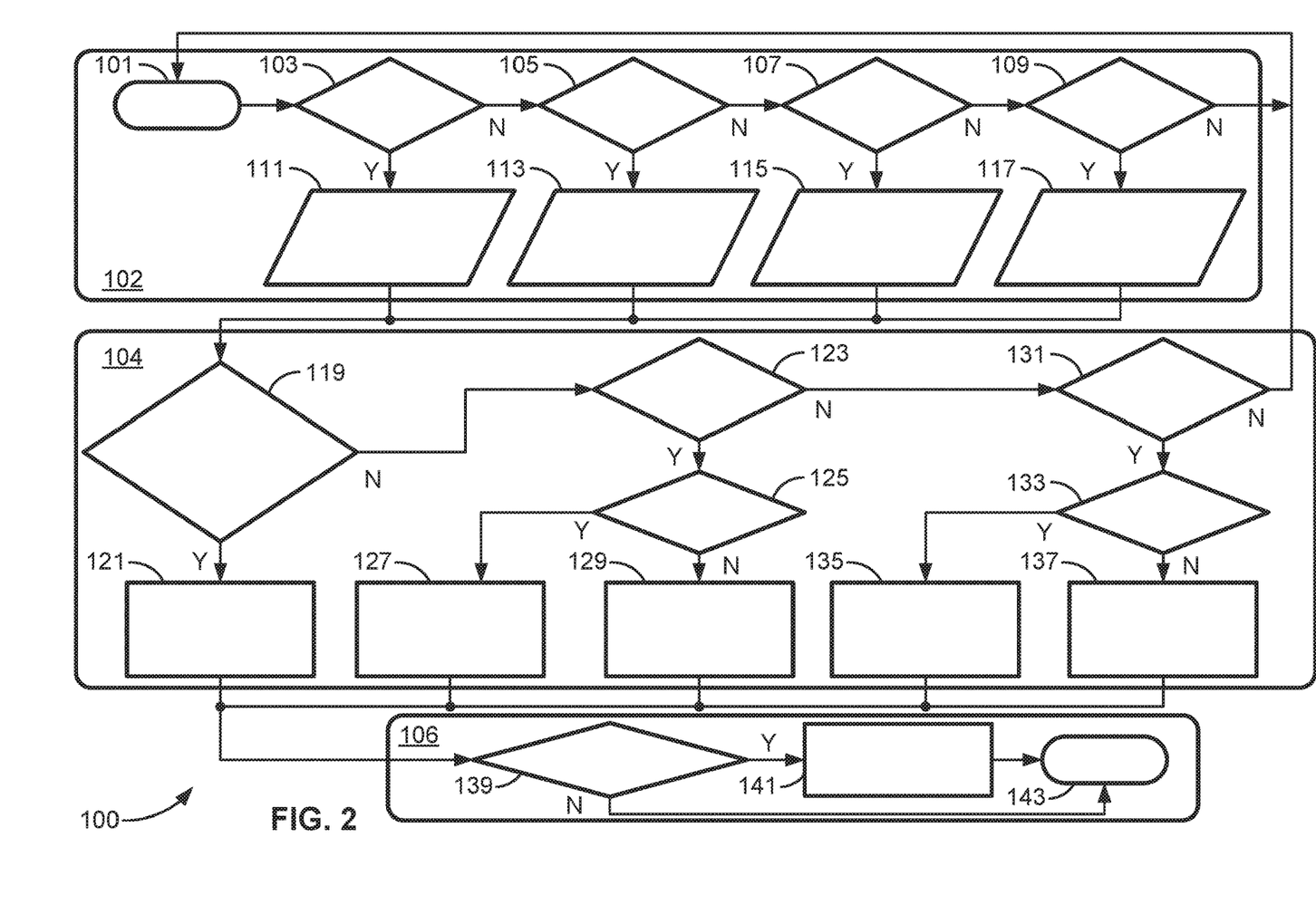
FIG. 2 is a flowchart illustrating a representative electrified powertrain control protocol, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for operating a high-voltage electrical system, such as the electrified powertrain of motor vehicle 10 of FIG. 1, is generally described at 100 in accordance with aspects of the present disclosure. Some or all of the operations illustrated in FIG. 2, and described in further detail below, may be representative of an algorithm that corresponds to processor-executable instructions that may be stored, for example, in main or auxiliary or remote memory, and executed, for example, by an electronic controller, processing unit, control logic circuit, or other module or device or network of modules/devices, to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 100 of FIG. 2 begins at terminal block 101 with memory-stored, processor-executable instructions for a programmable controller or control module or similarly suitable processor to call up an initialization procedure for a motor torque control protocol. This routine may be executed in real-time, continuously, systematically, sporadically and/or at regular intervals, for example, each 10 milliseconds during normal and ongoing operation of the motor vehicle 10. As yet another option, terminal block 101 may initialize responsive to a user command prompt or a broadcast prompt signal received from an "off-board" centralized host system (e.g., cloud computing service 44 of FIG. 1). Upon completion of the control operations presented in FIG. 2, the method 100 may advance to terminal block 143 and temporarily terminate or, optionally, may loop back to terminal block 101 and run in a continuous loop.

Upon initialization, method 100 executes subroutine process 102 to ascertain an appropriate collection of calibration setting associated with a present or desired operating mode of a subject power inverter and/or electric-drive vehicle. While illustrated as four discrete operations, decision blocks 103, 105, 107, 109 of FIG. 2 could be combined into a single decision block, for example, at which a vehicle controller (e.g., ECU 42 of FIG. 1) receives an input signal from a driver input device (e.g., center console telematics unit 50) and/or a vehicle control module (e.g., powertrain control module (PCM) 52) indicative of a selection from multiple available operating modes of the vehicle 10 or TPIM 26. If an occupant of the vehicle 10 selects a first vehicle operating mode, such as a Performance Mode (Mode==1; block 103=YES), method 100 responsively executes data input/output block 111 and selects, retrieves, calculates, or calibrates (collectively "determine") a respective set of calibration settings corresponding to operating Mode 1. On the other hand, if an occupant of the vehicle 10 does not opt for Mode 1 (block 103=NO) but rather selects a second vehicle operating mode, such as Eco Mode (Mode==2; block 105=YES), method 100 responsively executes data input/output block 113 and determines another respective set of calibration settings corresponding to operating Mode 2.

If neither Mode 1 nor Mode 2 is selected (block 103=NO; block 105=NO), the PCM 52 may select a first inverter performance mode, such as an inverter mode associated with Off-Road Mode (Mode==3; block 107=YES), method 100 responsively executes data input/output block 115 and determines a different respective set of calibration settings that corresponds to operating Mode 3. Upon determining that Mode 3 was not selected (block 107=NO), the method 100 may iterate through the remaining n vehicle/inverter modes, as indicated at decision block 109. If an $n^{th}$ mode is selected (block 109=YES), method 100 responsively executes data input/output block 117 and identifies an $n^{th}$ set of calibration settings corresponding to operating Mode n. Each suite of calibration settings may contain a set of coolant temperature thresholds calibrated to the selected mode; these CoolTemp thresholds may be similar in nature to the representative coolant temperature thresholds 311, 313, 315 and 317 shown in FIG. 4. In addition to the CoolTemp thresholds, each suite of calibration settings may contain a stall torque as well as a data set (e.g., lookup tables) of motor-calibrated torque limits as a function of CoolTemp for the selected mode.

Once the appropriate calibration settings are selected, method 100 advances to subroutine process 104 to derive motor torque limits as a function of inverter coolant temperature and DC bus voltage. Subroutine process 104 may begin with executing processor-executable instructions to ascertain a real-time or near real-time temperature of coolant fluid passing though the PIM, e.g., employing a suitable coolant temperature sensor 54. Using the present CoolTemp sensor reading, the method 100 determines, at decision block 119, if the power inverter's coolant temperature (PwrElecCoolTemp) is both: (1) greater than or equal to the a norm-low CoolTemp threshold (NormLoThrsh); and (2) less than or equal to a norm-high CoolTemp threshold (NormHiThrsh). In effect, decision block 119 is executed to ascertain whether or not the real-time inverter coolant temp is within a "normal" operating range (e.g., inside Zone 3 of FIG. 4). If so (block 119=YES&&YES), method 100 responsively executes process block 121 and employs the motor-calibrated torque limit data associated with the normal temp region 305 to set a motor torque limit (MotTrqLim) when the motor is in a positive-torque (motoring) operating mode and a regenerative braking torque limit (RegTrqLim) when the motor is in a negative-torque and/or negative-power (regen) operating mode.

Responsive to a determination that the inverter coolant temperature is not greater than or equal to the norm-low CoolTemp threshold and/or is not less than or equal to the norm-high CoolTemp threshold (block 119=NO), method 100 determines whether or not the power inverter's coolant temperature is less than the norm-low CoolTemp threshold (NormLoThrsh), as indicated at decision block 123. If so (block 123=YES), method 100 responsively determines whether or not the power inverter's coolant temperature is greater than a min-low CoolTemp threshold (LoThrsh), as indicated at decision block 125. In effect, decision blocks 123 and 125 are executed to ascertain whether or not the real-time inverter coolant temp is within a "low" or "blended-low" operating range (e.g., inside Zone 1 or Zone 2 of FIG. 4). If the inverter coolant temperature is within the "blended-low" temperature operating range (block 125=YES), method 100 responsively "blends" the motor-calibrated torque limit data associated with the low temp region 301 and the motor-calibrated torque limit data associated with the normal temp region 305, e.g., via linear interpolation, to set the motor torque limit and regenerative braking torque limit, as indicated at process block 127. Responsive to a determination that the inverter coolant temperature is within the "low" temperature operating range (block 125=NO), method 100 responsively executes process block 129 and employs the motor-calibrated torque limit data associated with the low temp region 301 to set the motor and regen torque limits.

With continuing reference to FIG. 2, method 100 reacts to a determination that the inverter coolant temperature is not less than the norm-low CoolTemp threshold (block 123=NO) by determining whether or not the power inverter's coolant temperature is greater than the norm-high CoolTemp threshold (NormHiThrsh), as indicated at decision block 131. If so (block 131=YES), method 100 responsively determines whether or not the power inverter's coolant temperature is less than a max-high CoolTemp threshold (HiThrsh), as indicated at decision block 133. Decision blocks 131 and 133 effectively function to ascertain whether or not the real-time inverter coolant temp is within a "high" or "blended-high" operating range (e.g., inside Zone 4 or Zone 5 of FIG. 4). If the inverter coolant temperature is within the "blended-high" temperature operating range (block 133=YES), method 100 responsively "blends" the motor-calibrated torque limit data associated with the normal temp region 305 and the motor-calibrated torque limit data associated with the high temp region 309, e.g., via linear interpolation, to set the motor torque limit and regenerative braking torque limit, as indicated at process block 135. Responsive to a determination that the inverter coolant temperature is within the "high" temperature operating range (block 133=NO), method 100 responsively executes process block 137 and employs the motor-calibrated torque limit data associated with the high temp region 309 to set the motor and regen torque limits.

Prior to, contemporaneous with, or subsequent to deriving motor torque limits as a function of inverter coolant temperature and DC bus voltage at subroutine process 104, method 100 conducts a stall torque threshold override procedure at subroutine process 106. Stall torque threshold override may be activated when the electric motor is operating at a speed that is below a motor-calibrated stall speed threshold. Similar to the motor torque limit, stall torque is selectively varied based on inverter coolant temperature and vehicle/inverter operating mode. In this regard, decision block 139 monitors real-time motor speed to assess whether or not current motor speed has fallen below a threshold stall torque speed associated with the stall torque in the suite of calibration settings retrieved via subroutine process 102. If not (block 139=NO), method 100 skips process block 141 and proceeds to terminal block 143.

If the stall torque speed threshold is in fact greater than current motor speed (block 139=YES), method 100 executes process block 141 and overrides the motor torque limit (MotTrqLim) and the regenerative braking torque limit (RegTrqLim) with coolant-temperature-dependent and vehicle/inverter-mode-dependent stall torque values. For instance, if the real-time inverter coolant temp is within a "normal" operating range, the stall torque is overwritten with a "normal" stall torque limit associated with the normal temp region (e.g., region 305 of FIG. 4). Similar to the determination conducted at decision block 119 above, the method 100 may determine if the power inverter's coolant temperature (PwrElecCoolTemp) is both: (1) greater than or equal to the a norm-low CoolTemp threshold (StallNormLoThrsh); and (2) less than or equal to a norm-high CoolTemp threshold (StallNormHiThrsh). If so, method 100 responsively executes a process block to set the stall torque limit to a normal stall torque limit.

On the other hand, if the inverter coolant temperature is within the "low" temperature range (PwrElecCoolTemp<StallNormLoThrsh && PwrElecCoolTemp<StallLoThrsh), the stall torque is overwritten with a "low" stall torque limit associated with the normal temp region 301. In the same vein, if the inverter coolant temperature is within the "high" temperature range (PwrElecCoolTemp>StallNormHiThrsh && PwrElecCoolTemp>StallHiThrsh), the stall torque is overwritten with a "high" stall torque limit associated with the normal temp region (e.g., region 305). By way of contrast, if the inverter coolant temperature falls within a blended temperature region (e.g., Zone 2 or Zone of FIG. 4) ((PwrElecCoolTemp<StallNormLoThrsh && PwrElecCoolTemp>StallLoThrsh) OR (PwrElecCoolTemp>StallNormHiThrsh && PwrElecCoolTemp<StallHiThrsh)) stall torque limits are calculated via linear interpolation in the same manner described above with respect to motor torque limit in process blocks 129 and 137 but using stall torque limit data of neighboring normal and low or high regions.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating an electric-drive vehicle, the electric-drive vehicle including a rechargeable battery, a direct-current (DC) bus, an electric motor, and a power inverter electrically connecting the rechargeable battery and the electric motor, the method comprising:
   identifying, via a vehicle controller, an operating mode of the electric-drive vehicle and/or the power inverter;
   determining calibration settings corresponding to the operating mode, the calibration settings including a first coolant temperature (CoolTemp) threshold, a second CoolTemp threshold higher than the first CoolTemp threshold, and a set of motor-calibrated torque limits as a function of CoolTemp and a present DC bus voltage of the DC bus;
   determining if a present CoolTemp of a coolant in the power inverter is greater than or equal to the first CoolTemp threshold and less than or equal to the second CoolTemp threshold;
   setting, responsive to the present CoolTemp being greater than or equal to the first CoolTemp threshold and less than or equal to the second CoolTemp threshold, a motor torque limit of the electric motor to a first torque limit value selected from a first fixed torque limit region within the motor-calibrated torque limits between the first and second CoolTemp thresholds; and
   transmitting, via the vehicle controller to the power inverter, a command signal to regulate a transfer of electrical power between the rechargeable battery and the electric motor based on the motor torque limit of the electric motor.

2. The method of claim 1, wherein the first CoolTemp threshold includes a first-low threshold and a second-low threshold less than the first-low threshold, the method further comprising, responsive to the present CoolTemp being less than the first-low threshold and greater than the second-low threshold, setting the motor torque limit to a second torque limit value selected from a first variable torque limit region between the first-low and second-low thresholds.

3. The method of claim 2, wherein selecting the second torque limit value from the first variable torque limit region includes interpolating between the first fixed torque limit region and a second fixed torque limit region associated with the second-low threshold.

4. The method of claim 2, further comprising, responsive to the present CoolTemp being less than the first-low threshold and the second-low threshold, setting the motor torque limit to a third torque limit value selected from a second fixed torque limit region associated with the second-low threshold within the set of motor-calibrated torque limits.

5. The method of claim 1, wherein the second CoolTemp threshold includes a first-high threshold and a second-high threshold greater than the first-high threshold, the method further comprising, responsive to the present CoolTemp being greater than the first-high threshold and less than the second-high threshold, setting the motor torque limit to a fourth torque limit value selected from a second variable torque limit region between the first-high and second-high thresholds within the set of motor-calibrated torque limits.

6. The method of claim 5, wherein selecting the fourth torque limit value from the second variable torque limit region includes interpolating between the first fixed torque limit region and a third fixed torque limit region associated with the second-high threshold.

7. The method of claim 5, further comprising, responsive to the present CoolTemp being greater than the first-high threshold and the second-high threshold, setting the motor torque limit to a fifth torque limit value selected from a third fixed torque limit region associated with the second-high threshold within the set of motor-calibrated torque limits.

8. The method of claim 1, wherein identifying the operating mode includes receiving, via the vehicle controller from a driver input device and/or a powertrain control module, a selection from a plurality of operating modes of the electric-drive vehicle and/or the power inverter.

9. The method of claim 8, wherein determining the calibration settings corresponding to the selected operating mode includes the vehicle controller retrieving the calibration settings from a memory device storing a respective set of calibration settings for each of the operating modes.

10. The method of claim 1, further comprising selecting a pulse width modulation (PWM) type as a function of the operating mode and the present CoolTemp, wherein regulating the transfer of electrical power between the rechargeable battery and the electric motor is further based on the selected PWM type.

11. The method of claim 1, wherein the calibration settings include a stall torque threshold of the electric motor selected from a plurality of stall torque thresholds based on the operating mode of the electric-drive vehicle and/or the power inverter.

12. The method of claim 11, the method further comprising:
   determining if a stall torque speed threshold of the stall torque threshold is greater than a present motor speed of the electric motor; and
   responsive to the stall torque speed threshold being greater than the present motor speed, setting the motor torque limit to the stall torque threshold.

13. The method of claim 1, wherein the motor torque limit includes a base motor torque limit and an enhanced motor torque limit greater than the base motor torque limit, the base motor torque limit associated with a first pulse width modulation (PWM) type and restricted by a maximum junction temperature of the power inverter, and the enhanced motor torque limit associated with a second pulse width modulation (PWM) type and restricted by the maximum junction temperature and an electrical overstress limit of the power inverter.

14. An electric-drive vehicle comprising:
   a vehicle body with multiple road wheels;
   a traction motor mounted on the vehicle body and operable to output torque to one or more of the road wheels to thereby propel the electric-drive vehicle;
   a traction battery pack mounted on the vehicle body and operable to power the traction motor;
   a power inverter module (PIM) electrically connecting the traction battery pack to the traction motor and operable to convert direct current (DC) power output by the traction battery pack to alternative current (AC) power and transfer the AC power to the traction motor; and
   a vehicle controller programmed to:
      identify an operating mode of the electric-drive vehicle and/or the PIM;

determine calibration settings corresponding to the operating mode, the calibration settings including a first coolant temperature (CoolTemp) threshold, a second CoolTemp threshold higher than the first CoolTemp threshold, and a set of motor-calibrated torque limits as a function of CoolTemp;

determine if a present CoolTemp of a coolant in the PIM is greater than or equal to the first CoolTemp threshold and less than or equal to the second CoolTemp threshold;

responsive to the present CoolTemp being greater than or equal to the first CoolTemp threshold and less than or equal to the second CoolTemp threshold, set a motor torque limit of the traction motor to a first torque limit value selected from a first fixed torque limit region within the set of motor-calibrated torque limits between the first and second CoolTemp thresholds; and transmit a command signal to the PIM to regulate a transfer of electrical power between the traction battery pack and the traction motor based on the motor torque limit of the traction motor.

15. The electric-drive vehicle of claim 14, wherein the first CoolTemp threshold includes a first-low threshold and a second-low threshold less than the first-low threshold, and wherein the vehicle controller is further programmed to, responsive to the present CoolTemp being less than the first-low threshold and greater than the second-low threshold, set the motor torque limit to a second torque limit value selected from a first variable torque limit region within the set of motor-calibrated torque limits between the first-low and second-low thresholds.

16. The electric-drive vehicle of claim 15, wherein selecting the second torque limit value from the first variable torque limit region includes interpolating between the first fixed torque limit region and a second fixed torque limit region associated with the second-low threshold.

17. The electric-drive vehicle of claim 15, wherein the vehicle controller is further programmed to, responsive to the present CoolTemp being less than the first-low threshold and the second-low threshold, setting the motor torque limit to a third torque limit value selected from a second fixed torque limit region associated with the second-low threshold within the set of motor-calibrated torque limits.

18. The electric-drive vehicle of claim 14, wherein the second CoolTemp threshold includes a first-high threshold and a second-high threshold greater than the first-high threshold, and wherein the vehicle controller is further programmed to, responsive to the present CoolTemp being greater than the first-high threshold and less than the second-high threshold, set the motor torque limit to a fourth torque limit value selected from a second variable torque limit region within the set of motor-calibrated torque limits between the first-high and second-high thresholds.

19. The electric-drive vehicle of claim 18, wherein selecting the fourth torque limit value from the second variable torque limit region includes interpolating between the first fixed torque limit region and a third fixed torque limit region associated with the second-high threshold.

20. The electric-drive vehicle of claim 18, wherein the vehicle controller is further programmed to, responsive to the present CoolTemp being greater than the first-high threshold and the second-high threshold, setting the motor torque limit to a fifth torque limit value selected from a third fixed torque limit region associated with the second-high threshold within the set of motor-calibrated torque limits.

* * * * *